US012466113B2

(12) United States Patent
Kitani et al.

(10) Patent No.: US 12,466,113 B2
(45) Date of Patent: Nov. 11, 2025

(54) INTERNAL MOLD RELEASE AGENT-CONTAINING FIBER-REINFORCED COMPOSITE MOLDED ARTICLE

(71) Applicant: Toray Industries, Inc., Tokyo (JP)

(72) Inventors: Chiasa Kitani, Tokyo (JP); Satoshi Matsumoto, Nagoya (JP); Naoya Ouchiyama, Nagoya (JP); Shigeru Kawashima, Nagoya (JP); Atsuki Tsuchiya, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 505 days.

(21) Appl. No.: 17/800,404

(22) PCT Filed: Feb. 5, 2021

(86) PCT No.: PCT/JP2021/004415
§ 371 (c)(1),
(2) Date: Aug. 17, 2022

(87) PCT Pub. No.: WO2021/166698
PCT Pub. Date: Aug. 26, 2021

(65) Prior Publication Data

US 2023/0106971 A1 Apr. 6, 2023

(30) Foreign Application Priority Data

Feb. 21, 2020 (JP) ................................ 2020-027995

(51) Int. Cl.
*B29C 33/64* (2006.01)
*B29C 70/18* (2006.01)
*B29K 63/00* (2006.01)

(52) U.S. Cl.
CPC .............. *B29C 33/64* (2013.01); *B29C 70/18* (2013.01); *B29K 2063/00* (2013.01)

(58) Field of Classification Search
CPC ...... B29C 33/64; B29C 70/18; B29K 2063/00
See application file for complete search history.

(56) References Cited

U.S. PATENT DOCUMENTS

| | | | | |
|---|---|---|---|---|
| 2012/0247820 | A1* | 10/2012 | Miyatake | H05K 1/0353 428/458 |
| 2020/0056006 | A1* | 2/2020 | Yokota | C08J 5/249 |
| 2021/0032425 | A1 | 2/2021 | Harada et al. | |

FOREIGN PATENT DOCUMENTS

| | | | | |
|---|---|---|---|---|
| JP | 03287628 | A | | 12/1991 |
| JP | 2010229326 | A | | 10/2010 |
| JP | 2010274612 | A | | 12/2010 |
| JP | 2011089071 | A | | 5/2011 |
| JP | 2012125292 | A | | 7/2012 |
| JP | 2015151457 | A | | 8/2015 |
| JP | 2017132858 | A | | 8/2017 |
| JP | 2017203107 | A | | 11/2017 |
| JP | 2019009195 | A | * | 1/2019 |
| WO | 2019208040 | A1 | | 10/2019 |
| WO | WO-2019188020 | A1 | * | 10/2019 |

OTHER PUBLICATIONS

Machine Translation of Sato et al. (WO 2019188020 A1) (Year: 2019).*
Machine Translation of Kobayashi et al. (JP 2019/009195 A) (Year: 2019).*
Shin-Etsu Silicone, online Dec. 13, 2024, https://www.shinetsusilicone-global.com/products/type/oil/detail/search/deg02.shtml (Year: 2024).*
Chinese Office Action for Chinese Application No. 202180007531.1, dated Aug. 31, 2023 with partial English 1 translation, 9 pages.
International Search Report and Written Opinion for International Application No. PCT/JP2021/004415, dated Apr. 6, 2021, 7 pages.

* cited by examiner

*Primary Examiner* — Callie E Shosho
*Assistant Examiner* — Bethany M Miller
(74) *Attorney, Agent, or Firm* — Buchanan Ingersoll & Rooney PC

(57) ABSTRACT

A fiber-reinforced composite molded article which is obtained by molding reinforcing fibers and an epoxy resin, while containing a silicone oil as an internal mold release agent, and which is characterized in that the fragment ion intensity ratio A/B as detected in case where the molded article surface is analyzed by time-of-flight secondary ion mass spectrometry is expressed by the relationship of $3 \leq A/B \leq 20$. A: The intensity of a fragment ion that has the highest intensity among the fragment ions derived from the silicone oil. B: The intensity of a fragment ion that has the highest intensity among the fragment ions derived from the epoxy resin. A fiber-reinforced resin molded article according to the present invention is capable of achieving high productivity and high quality by effectively exhibiting releasability from a mold with a small addition amount of a mold release agent without using an external mold release agent, while being capable of exhibiting high adhesion to other members without requiring a special surface treatment such as sanding.

6 Claims, 3 Drawing Sheets

INTERNAL MOLD RELEASE AGENT-CONTAINING FIBER-REINFORCED COMPOSITE MOLDED ARTICLE

CROSS REFERENCE TO RELATED APPLICATIONS

This is the U.S. National Phase application of PCT/JP2021/004415, filed Feb. 5, 2021, which claims priority to Japanese Patent Application No. 2020-027995, filed Feb. 21, 2020, the disclosures of each of these applications being incorporated herein by reference in their entireties for all purposes.

TECHNICAL FIELD OF THE INVENTION

The present invention relates to a fiber-reinforced composite molded article using a mold release agent for a fiber-reinforced composite material.

BACKGROUND OF THE INVENTION

Fiber-reinforced resin materials are used in a wide range of fields such as aircraft, automobiles, and industrial applications such as sports and leisure because of their high strength and high rigidity. Such a fiber-reinforced resin material is molded by various molding methods such as resin transfer molding, autoclave molding, pultrusion, compression molding, injection molding and filament winding according to its use and shape. When these molding methods are selected, a mold release agent is broadly used because it is necessary to remove a molded article from a mold after molding.

For example, in Patent document 1, a mold release agent (external mold release agent) is applied (or sprayed) to a mold to form a thin film composed of a mold release agent component on the surface of the mold, whereby the releasability with the molded article is secured. On the other hand, as in Patent document 2, a method wherein a mold release agent (internal mold release agent) is added in advance to a resin composition comprising a thermosetting resin, and when the resin composition is cured in the mold, the mold release agent component is bled out onto the surface of the molded article to exhibit the releasability with the mold, is also employed.

Further, as in Patent document 3, there is a technology for adding a liquid silicone for providing a liquid epoxy resin composition that facilitates mold release from a mold and a liquid epoxy resin molding material excellent in continuous moldability, and as in Patent document 4, there is also an example in which a fiber-reinforced composite material capable of exhibiting excellent releasability can be provided by using a fluorine-based mold release agent.

Patent Documents

Patent document 1: JP-A-2010-274612
Patent document 2: JP-A-2011-89071
Patent document 3: JP-A-2015-151457
Patent document 4: JP-A-2017-203107

SUMMARY OF THE INVENTION

On the other hand, in the molding method using the external mold release agent as shown in Patent document 1, because the releasability with the mold surface decreases as the molding is repeated, it is necessary to frequently apply (or spray) the mold release agent to the mold surface, which leads to an increase in molding cost and labor. In particular, in case where the resin is an epoxy resin, the adhesion with a metal is strong, and there is a possibility where the resin may remain as burrs on the mold surface after molding, which takes time and cost to remove burrs and also may impair the quality of the molded article surface.

Further, in the method of adding the internal mold release agent into the epoxy resin composition as shown in Patent document 2, in order to secure sufficient releasability depending on the kind of the mold release agent, it is necessary to add a large amount of mold release agent such as at maximum ten and several parts by mass with respect to 100 parts by mass of the total resin. However, because the whole of the internal mold release agent added does not bleed out to the molded article surface during curing and most of that remains in the molded article, in case where the addition amount is large, there is a fear that the physical and mechanical properties of the molded article may decrease.

Further, the polyether and epoxy-modified liquid silicones used in Patent document 3 do not have a sufficient effect for exhibiting a releasability with respect to an epoxy resin, and therefore, in molding for industrial applications based on thin walls and complicated shapes, it is difficult to obtain a molded article with a small amount of addition without using an external mold release agent.

Furthermore, it is said that the mold release agent used in Patent document 4 has a melting point or softening point of 25° C. or higher and 100° C. or lower in order to reduce the bleeding property for a material that is stored at a low temperature before molding, such as a prepreg or a sheet molding compound material. In such a mold release agent that solidifies at a room temperature, the hardness of the material itself is increased, which may cause deterioration of handling ability and mechanical properties after molding. Moreover, because there is no index for a good state of the releasability, although there is a description that it is not necessary to apply an external mold release agent frequently, the provision of materials for performing molding without applying the external mold release agent has not been reached.

On the other hand, in a post-processing process such as a bonding process with another member (made of a metal or a fiber-reinforced resin) of the molded article and a painting process, the adhesion and adhesiveness with an adhesive material and a paint material are required completely opposite to the time of molding. Since the mold release agent layer formed on the surface of the molded article may lead to poor adhesion and paint peeling, it is necessary to sufficiently remove the mold release agent layer on the surface by sanding or the like. This removal of the mold release agent leads to a great deal of time and cost as the mold release agent layer formed on the molded article surface becomes thicker.

Therefore, required is a process that can be released from a mold with a minimum amount of an internal mold release agent and that can be bonded with a simpler treatment before bonding, but it has not yet been reached to provide a material capable of satisfying both releasability and adhesion which are conflicting properties.

In view of various problems in the conventional technologies described above, an object of the present invention is to provide a fiber-reinforced composite molded article wherein, in case where an epoxy resin composition to which an internal mold release agent is added is used as a molding material of the fiber-reinforced composite molded article, high productivity and quality can be achieved by effectively exhibiting the releasability from the mold at a small addition amount of the internal mold release agent amount without using an external mold release agent, and a high adhesion with another member can be exhibited even if a special surface treatment such as sanding is not performed.

As a result of various studies on the prescription and adhesion of the internal mold release agent in order to solve the above-described problems, the inventors of the present invention have found that a fiber-reinforced composite molded article exhibiting a high adhesion only by a simple degreasing treatment without performing sanding while exhibiting a good releasability from a mold, and a joined structure in which it is joined to another member, can be realized in the fiber-reinforced composite molded article shown below.

Namely, the present invention according to exemplary embodiments has the following configuration.

(1) A fiber-reinforced composite molded article which is obtained by molding reinforcing fibers and an epoxy resin, while containing a silicone oil as an internal mold release agent, characterized in that a fragment ion intensity ratio as detected in case where a surface of the molded article is analyzed by time-of-flight secondary ion mass spectrometry is expressed by the relationship of the following equation (I).

$$3 \leq A/B \leq 20 \quad (I)$$

A: an intensity of a fragment ion that has the highest intensity among the fragment ions derived from the silicone oil B: an intensity of a fragment ion that has the highest intensity among the fragment ions derived from the epoxy resin (2) The fiber-reinforced composite molded article according to (1), wherein the following equation (II) is further satisfied.

$$3 \leq A/B \leq 5 \quad (II)$$

(3) The fiber-reinforced composite molded article according to (1) or (2), wherein a contact angle of the surface of the fiber-reinforced composite molded article with respect to water is 90 degrees or more.

(4) The fiber-reinforced composite molded article according to any one of (1) to (3), wherein the silicone oil is an end-modified silicone oil.

(5) The fiber-reinforced composite molded article according to any one of (1) to (4), wherein the silicone oil has a viscosity of 50 $mm^2/s$ or more and 1,000 $mm^2/s$ or less.

(6) The fiber-reinforced composite molded article according to any one of (1) to (5), wherein the silicone oil has a functional group equivalent of 300 g/mol or more and 2,000 g/mol or less.

(7) The fiber-reinforced composite molded article according to any one of (1) to (6), wherein an addition amount of the silicone oil is 0.1 part by mass or more and 1 part by mass or less with respect to 100 parts by mass of the epoxy resin.

(8) A joined structure in which the fiber-reinforced composite molded article according to any one of (1) to (7) is joined to another member with an adhesive.

(9) The joined structure according to (8), wherein the joining is performed without any pretreatment other than degreasing.

The fiber-reinforced resin molded article according to embodiments of the present invention can achieve high productivity and quality by effectively exhibiting the releasability with the mold with a small addition amount of the mold release agent and without using an external mold release agent, and can exhibit a high adhesion with another member even if a special surface treatment such as sanding is not performed.

DETAILED DESCRIPTION OF EMBODIMENTS OF THE INVENTION

Figure 1:
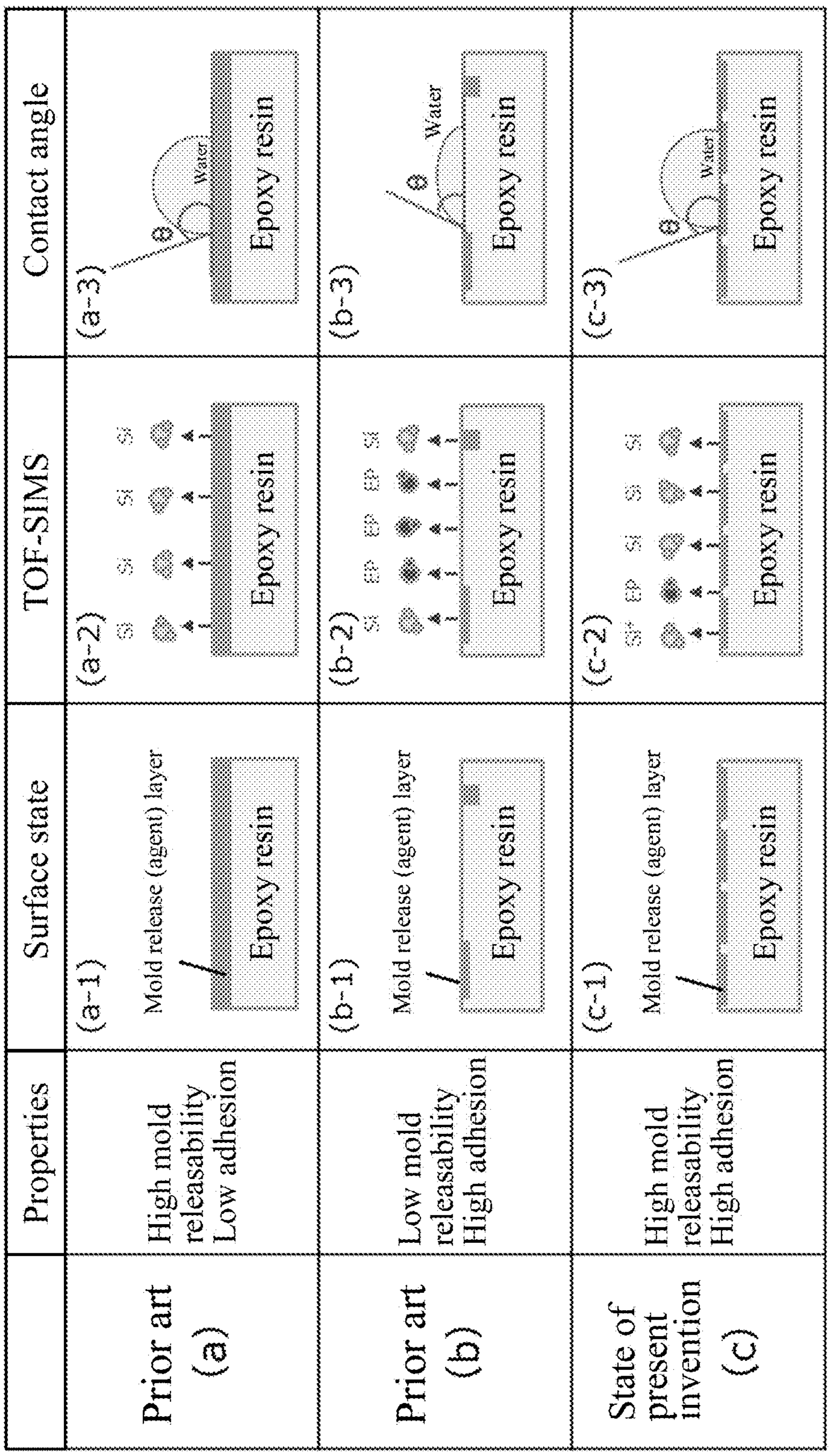
FIG. 1 is a modified diagram showing the concept of the exhibition form of the effect according to an embodiment of the present invention in comparison with the prior art.

The fiber-reinforced composite molded article according to an embodiment of the present invention is a fiber-reinforced composite molded article obtained by molding reinforcing fibers and an epoxy resin, while containing a silicone oil as an internal mold release agent, and is characterized in that a fragment ion intensity ratio as detected in case where a surface of the molded article is analyzed by time-of-flight secondary ion mass spectrometry is expressed by the relationship of the following equation (I), and further preferably, the following equation (II) is satisfied.

$$3 \leq A/B \leq 20 \quad (I)$$

$$3 \leq A/B \leq 5 \quad (II)$$

A: an intensity of a fragment ion that has the highest intensity among the fragment ions derived from the silicone oil B: an intensity of a fragment ion that has the highest intensity among the fragment ions derived from the epoxy resin Hereinafter, the present invention will be explained in detail together with embodiments with reference to the drawings.

(Matrix Resin)

As the epoxy resin used in the fiber-reinforced composite molded article in the present invention is not particularly limited as long as it is a compound having two or more epoxy groups in the compound, but for example, exemplified are bisphenol A type epoxy resin, bisphenol F type epoxy resin, bisphenol D type epoxy resin, naphthalene type epoxy resin, biphenyl type epoxy resin, glycidyl amine type epoxy resin, dicyclopentadiene type epoxy resin, phenol novolac type epoxy resin, aliphatic epoxy resin, alicyclic epoxy resin, prepolymers of the above-described epoxy resins, and a copolymer of the above-described epoxy resin and another polymer such as polyether-modified epoxy resin or silicone-modified epoxy resin. These may be used alone or in combination of two or more.

Further, the epoxy resin in the present invention is preferably cured by using various curing agents such as an acid anhydride-based curing agent, an amine-based curing agent, a phenol-based curing agent and a thiol-based curing agent from the viewpoint that the curability and the property of the cured article can be adjusted. In particular, in case where an acid anhydride-based curing agent is used, it is generally preferable from the viewpoint of improving heat resistance and chemical resistance, and in case where an amine-based curing agent is used, it is generally preferable from the viewpoint of low-temperature curability and high adhesion.

An isocyanate component may be used as another component in various embodiments of the present invention in order to improve heat resistance. The isocyanate compound is not particularly limited as long as it has two or more isocyanate groups on average in one molecule, and known aliphatic isocyanates and aromatic isocyanates can be used. Polyisocyanate compounds and the like may be used alone or in combination of two or more.

Further, in case of using these isocyanates, when adding an internal mold release agent having a reactive functional group, it is desirable that the reactivity with the functional group is appropriate, especially in case of using an aromatic isocyanate, since it is more reactive than aliphatic isocyanates, it is more likely to react with the modified group of the added silicone mold release agent, and while the control for the releasability and for exhibiting high physical properties of the fiber-reinforced composite molded article is difficult such as it becomes necessary to increase the addition amount itself and the functional group equivalent of the internal mold release agent, the mold release agent can form a layer regularly and uniformly on the surface of the molded article.

Furthermore, the resin may contain other fillers and additives according to the required properties, as long as the object of the present invention is not impaired. For example, exemplified are curing accelerators, inorganic fillers, flame retardants, conductivity-imparting agents, crystal nucleating agents, ultraviolet absorbers, antioxidants, vibration damping agents, antibacterial agents, insect repellents, deodorants, coloring prevention agents, thermal stabilizers, lubricants, antistatic agents, plasticizers, colorants, pigments, dyes, foaming agents, antifoaming agents, coupling agents and the like.

[Reinforcing Fibers]

The reinforcing fibers in the present invention are not particularly limited, and carbon fibers, glass fibers, aramid fibers and the like, and further, reinforcing fibers in which these are mixed, can be used. Among them, it is preferred to contain carbon fibers from the viewpoint of exhibiting preferable high mechanical properties and easiness of designing the properties. Further, as for the fiber form, a continuous fiber form, a chopped fiber form, or the like can be appropriately selected.

[Internal Mold Release Agent]

As the internal mold release agent added to the fiber-reinforced composite molded article according to embodiments of the present invention, metal soaps, polyethylene waxes, animal and vegetable waxes such as carbana wax, fatty acid ester-based, silicone-based and fluorine-based nonionic surfactants and the like can be exemplified, and a silicone-based mold release agent is preferable because it has an excellent releasability. By using silicone oil among the silicone mold release agents, the impregnation property of resin composition into reinforcing fibers can be improved. By the condition where the mold release agent is a liquid, it is possible to prevent the mold release agent from being biased due to being strained by the fibers when impregnated into the reinforcing fibers, and further, even in a material handled in a semi-cured state such as a prepreg or a sheet molding compound, the hardness of the semi-cured material can be kept soft. In particular, as the silicone oil, a modified silicone oil having reactivity in which functional groups $R^1$ to $R^3$ are introduced into the side chain or the terminal of a polysiloxane as represented by the following formula (I) or (II) is more preferable.

[Chemical formula 1]

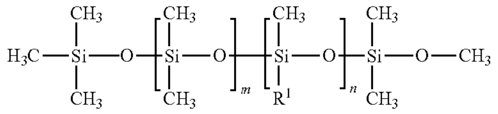

(I)

[Chemical formula 2]

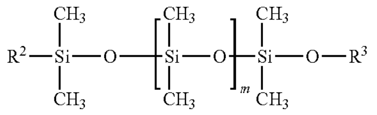

(II)

Here, $R^1$ and $R^2$ represent a functional group containing any one of an amino group, an epoxy group, a carboxyl group, a thiol group, a carbinol group, a methacrylic group and a phenol group. $R^3$ represents a methyl group, an amino group, an epoxy group, a carboxyl group, a thiol group, a carbinol group, a methacrylic group or a phenol group.

By the presence of such a functional group R, the functional group R reacts with the matrix resin in the matrix resin after molding and the mold release agent component is immobilized in the matrix resin, the mold release agent component is suppressed from bleeding out to the molded article surface over time after molding, and a decrease in adhesive strength can be suppressed in the bonding process of the molded article. This is because, in case where it is not immobilized by the matrix resin and the functional group R, the mold release agent component remaining inside the molded article moves to the surface side due to aging, and an adhesively fragile layer is formed at the adhesive interface and the coating film interface, the peeling thereof progresses, and on the other hand, by being immobilized, the peeling suppressing effect is produced.

Further, the length and structure of the siloxane existing between the two functional groups R in the same molecule or between the functional group R and the end of the siloxane chain greatly affect both releasability and adhesion. As examples of such a functional group R, an amino group, an epoxy group, a carboxyl group, a thiol group, a carbinol group, a methacrylic group, a phenol group and the like can be exemplified, and from these groups it can be appropriately selected. Among them, the thiol group and carboxyl group modifications are lower especially in reactivity with epoxy resin than the amino group and carbinol group modifications, so that the amount of bleeding capable of exhibiting releasability can be secured with a small amount of addition. In addition, since it has higher compatibility than the ether and epoxy modifications and it can be well dispersed in the matrix resin, it can bleed uniformly on the molded article surface, and a good releasability can be stably obtained. Further, as the modification site, side chain modification is generally performed as shown in the formula (I), and it can be selected according to the resin and molding conditions. As shown in the formula (II), if both or single terminal modification is performed, the variation in the functional group equivalent is small and the behavior in the matrix resin is easy to control, so that the variation in the degree of exhibition of releasability becomes also small.

Furthermore, in order to realize mold release from the mold with the minimum required addition amount, it is necessary to finely disperse the internal mold release agent with a particle size of the order of nanometers to several microns in the epoxy resin. This is because the mold release agent layer can be formed when the epoxy resin is cured only by the mold release agent component which is present at a very short distance from the mold surface. Therefore, in case where the mold release agent is dispersed in the uncured epoxy resin at a coarse state, because the particle density of the mold release agent decreases, the mold release agent component does not exist, that is, since the area where the epoxy resin is directly contacted with the mold increases, the releasability is extremely deteriorated. Therefore, the viscosity of the mold release agent is preferably 50 $mm^2/s$ or more and 1,000 $mm^2/s$ or less from the viewpoint of easiness of measuring at the time of preparation. If the viscosity is lower than 50 $mm^2/s$, it is difficult to handle at the time of preparation and the separation from the matrix resin becomes quick, and if the viscosity is higher than 1,000 $mm^2/s$, it becomes difficult to finely disperse at the time of stirring.

Further, the functional group equivalent, that is, the molecular weight per one functional group R is preferably 300 g/mol or more and 2,000 g/mol or less. If the functional group equivalent is smaller than 300 g/mol, because the ratio of the siloxane chain exhibiting the releasability to the addition amount of the mold release agent becomes low, the addition amount must be increased, and if it becomes larger than 2,000 g/mol, because the compatibility with the epoxy resin becomes low, it aggregates in the resin and cannot bleed uniformly on the surface, and besides, there is a possibility to cause poor appearance of the molded article and decrease of mechanical properties of the molded article.

Further, the addition amount of these internal mold release agents is preferably 0.1 part by mass or more and 1 part by mass or less with respect to 100 parts by mass of epoxy resin. In case out of this range, in the process of molding a resin composition for the fiber-reinforced resin material or after the molding, by releasing defect due to insufficiency of the mold release agent or excessive bleeding out of the mold release agent, there is a fear of hindering the process such as the bonding or painting process of the molded article. Further, in case where a two-liquid system resin is used as a resin to which the internal mold release agent is added, it may be added to either the main agent or the curing agent, or may be added after the main agent and the curing agent are mixed. Further, it is preferred that the temperature at the time of addition is lower than the reactive temperature between the mold release agent and the resin, and is a temperature achieving a viscosity at which the resin and the mold release agent can be stirred and mixed.

(Fiber-Reinforced Composite Molded Article)

FIG. 1 is a diagram schematically showing the state of the mold release agent on the surface of a fiber-reinforced composite molded article by showing the concept of the exhibition form of the effect according to an embodiment of the present invention in comparison with the prior art. Conventionally, in case where a silicone mold release agent is used in order to exhibit a high releasability during molding of a fiber-reinforced composite molded article, it is considered that a uniform mold release agent layer may be formed on the molded article surface regardless of whether an external mold release agent or an internal mold release agent is used. In case where the releasability is to be ensured by adding a large amount of the conventional internal mold release agent (FIG. 1: the prior art (a)), the mold release agent component forms a dense layer on the epoxy resin. At this time, since the epoxy resin component is covered with the mold release agent layer, it is not exposed on the surface (a-1). At this time, since the hydrophobicity of the surface becomes high and the wettability with respect to a polar liquid such as an adhesive or a paint becomes poor, the contact angle (θ) with water shows 90 degrees or more (a-3). On the other hand, since the mold release agent layer is extremely low in reactivity, the adhesion to adhesives or paints is reduced.

On the contrary, in the surface of the molded article with a low releasability shown in the prior art (b), because the film of the mold release agent is distributed in a mottled manner on the molded article surface as shown in (b-1), a state is formed wherein the epoxy resin is exposed on the surface with an area larger than the order of several tens of μm square. Therefore, the mold and the resin are highly adhered to each other in the exposed portion of the epoxy resin, and a large amount of energy is required to break this bond, so that the releasability is significantly reduced. Where, the wettability of the molded article surface at this time is lower in contact angle than that of (a-3) because the epoxy resin itself has a little polarity, and it becomes about 70 to 80 degrees (b-3).

As compared with these prior arts, the surface state of the fiber-reinforced composite molded article in an embodiment of the present invention (c) becomes a state shown as (c-1). The molded article surface (c-1) according to an embodiment of the present invention is located, frankly speaking, in an intermediate state between (a-1) and (b-1), and it is in a state where the epoxy resin component is exposed in a gap between the mold release agent components. The difference from the prior art (b) is in that this gap region is extremely small (on the order of several nanometers to several micrometers square) and is evenly distributed. Although the surface area of the mold release agent layer is reduced by the amount that the resin component is exposed, as compared with the prior art (a), a sufficiently large amount of mold release agent is present on the molded article surface, and the macroscopic surface property of wettability also does not change (c-3). In addition, because the resin component exposed in the gaps of the mold release agent layer is evenly distributed in a very narrow minute area (on the order of several nanometers to several micrometers square), an excessive energy is not required for breaking the adhesion with the mold. Therefore, the molded article can be removed from the mold with a load sufficiently low in the same degree as that of the prior art (a).

On the other hand, since the releasability is exhibited, it may seem that an adhesion with adhesives and paints is not exhibited without special treatment, but the molded article according to embodiments of the present invention exhibits a sufficient adhesion only by pretreatment having a degree such as one of degreasing. With respect to this, although the mechanism has not been fully clarified, the present inventors speculate that the aforementioned modifying group R of the mold release agent (silicone oil) contributes. In the molded release agent layer formed by bleeding out to the molded article surface, differently from the inside of the molded article, it is considered that the modifying group R remaining without reacting with the epoxy resin is present. In particular, the mold release agent component on the outermost surface in contact with the adhesive is considered to be deposited earliest from the molded article, and it is presumed that the unreacted residue R is relatively large in amount. Therefore, it is considered that, when an adhesive or a paint is applied, this residue R undergoes a curing reaction with these molecules to form a strong bond at the interface with the molded article surface and to exhibit a strong adhesion.

In order to exhibit both such releasability and adhesion, it is necessary that both the component derived from the internal mold release agent (silicone oil) and the component derived from the epoxy resin are evenly and uniformly present on the molded article surface, and as an index for quantifying the component ratio, the fragment ion intensity determined by time-of-flight secondary ion mass spectrometry (TOF-SIMS) is used.

TOF-SIMS is an analyzing method wherein pulsed ions (primary ions) are irradiated to the surface of a sample placed in a ultra-high vacuum, fragment ions (secondary ions) released from the sample surface with a certain amount of kinetic energy are detected by a time-of-flight mass spectrometer. Secondary ions accelerated by the same energy pass through the analyzer at a speed according to the mass, but since the distance to the detector is constant, the time to reach there (flight time) is a function of mass, and by precisely measuring the distribution of this flight time, the mass distribution of secondary ions, that is, the mass spectrum can be obtained. By analyzing this mass spectrum, organic substances and inorganic substances existing on the sample surface can be identified, and information on the amount of presence can be obtained from the peak intensity. Further, by converging the primary ion beam to 1 μm or less, it is possible to analyze minute parts and perform imaging measurement (distribution observation) with a high spatial resolution.

For the fiber-reinforced composite molded article according to embodiments of the present invention, it is necessary that the fragment ion intensity ratio detected when analyzed by time-of-flight secondary ion mass spectrometry is expressed by the relationship of the following equation (I), and preferably by the equation (II).

$$3 \leq A/B \leq 20 \quad \text{(I)}$$

$$3 \leq A/B \leq 5 \quad \text{(II)}$$

A: an intensity of a fragment ion that has the highest intensity among the fragment ions derived from the silicone oil B: an intensity of a fragment ion that has the highest intensity among the fragment ions derived from the epoxy resin If the ion intensity ratio represented by the equations (I) and (II) becomes smaller than 3, as shown in FIG. 1 (b-2), the fragment ions derived from epoxy resin (indicated as "EP" in (b-2)) are often detected, that is, because the silicone oil aggregates before curing the epoxy resin, it cannot be uniformly deposited on the molded article surface, indicating that the epoxy resin is overexposed, and it is not possible to exhibit a target releasability. Further, if the ion intensity ratio becomes larger than 20, it means that the fragment ions (indicated by "Si" in FIG. 1 (a-2)) derived from the silicone oil released from the molded article surface is extremely large in amount, which means that the mold release agent components cover the entire molded article surface too much. Further, the increase in the ion intensity ratio also means that the distribution of the mold release agent increases not only in the plane direction but also in the thickness direction of the molded article. If the high-concentration region of the mold release agent component expands in the thickness direction, because the region becomes a mechanically fragile region, a sufficient adhesion cannot be exhibited as it is, and it becomes necessary to remove the mold release agent layer physically by sanding or the like. If the ion intensity ratio is 20 or less, the mold release agent layer is appropriate in both the plane direction and the thickness direction, and the adhesion can be exhibited only by degreasing treatment with a solvent such as alcohols, which is preferable, and further, if it is 5 or less, while ensuring the releasability, the adhesion can be further enhanced.

With respect to such fragment ions derived from the silicone oil and the epoxy resin, various ions having various masses can be detected. As the detected fragment ion derived from the silicone oil, for example, exemplified are $^{73}SiC_3H_9$+, $^{147}SiC_5H_{15}O$+ and $^{207}Si_3C_5H_{15}O_3$+. Further, as the fragment ion derived from the epoxy resin, although it cannot be uniquely shown because it differs depending on the type of the used epoxy resin and curing agent, for example, in case of bisphenol A type epoxy resin×amine-based curing agent, $^{107}C_7H_7O$+, $^{135}C_9H_{11}O$+, $^{42}C_2H_4N$+, $^{44}C_2H_6N$+, $^{58}C_3H_8N$+, $C_xH_y$+, etc. are detected as the fragment ions. Where, the ion intensity is calculated by performing Poisson correction on the observed intensity. The Poisson correction supplements the ion intensity guided to the mass spectrometer during the dead time in TOF-SIMS, and the intensity increases after the correction as compared with that before the correction. Among the various fragment ions derived from the silicone oil and the epoxy resin thus calculated, the ratio of the fragment ion having the highest intensity (that is, the largest number) is taken as an index of the surface state. However, the method of taking the ratio is not limited to this, and the intensity ratio can also be taken by summing up a plurality of ion intensities.

Further, in the fiber-reinforced composite molded article according to the present invention, it is preferred that the contact angle of the molded article surface with respect to water is 90 degrees or more. As aforementioned, the contact angle is an index for ensuring the releasability, and if it becomes smaller than 90 degrees, it means that the mold release agent layer cannot exhibit the releasability, and if it is 90 degrees or more, it can exhibit a high releasability.

The molding base material and molding method of the fiber-reinforced composite molded article of the present invention are not particularly limited, and known materials and molding methods can be applied. For example, as an application example of the base material for molding, it can be used as a sheet molding compound (SMC) base material in which a matrix resin is impregnated into a reinforcing fiber base material in which chopped strands cut to a fiber length of about 0.1 mm to 5 mm are dispersed in a mat form, or a prepreg base material prepared by impregnating a matrix resin into reinforcing fibers continuously aligned in one direction. Further, in these base materials, in fiber-reinforced resin molded articles obtained by compression molding or autoclave molding, an excellent releasability can be provided and a high productivity can be achieved. However, the application is not limited to these reinforcing fiber base materials, and the resin composition of the present invention can also be applied to various molding methods such as resin transfer molding, pultrusion, injection molding and filament winding. Also in the fiber-reinforced resin molded articles obtained from these above-described base materials and molding methods, a high productivity can be realized similarly.

In particular, in the fiber-reinforced composite molded article of the present invention, the volume ratio of reinforcing fibers to resin composition is preferably 10 to 90%. If the volume ratio is less than 10%, even if the releasability is good, a local load applied to the molded article at the time of mold release cannot be withstood and the molded article is likely to be easily broken, and if it is larger than 90%, the absolute amount of the resin and mold release agent present on the surface of the molded article becomes small, which may cause defective mold release.

Further, it is preferred that the molding temperature of the fiber-reinforced composite molded article of the present invention at the time of curing molding is 30° C. or higher and 200° C. or lower. If the molding temperature is lower than 30° C., by a condition where the curing reaction proceeds while the viscosity at the time of molding is high, and if the molding temperature exceeds 200° C., by a condition where the molding time becomes too short for a fast-curing resin, the bleed out of the mold release agent is suppressed.

Furthermore, in case where the fiber-reinforced composite molded article of the present invention is molded by compression molding, it is preferred to flow the article so that the area ratio of the area after molding to the area before molding becomes 300% or less. Compression molding is often selected for a high-cycle molding, which requires a reduction in the treatment time of the mold release agent, but if molding is performed at a flow rate greater than 300% at this time, the flow tends to be biased, and along with this, the resin and the mold release agent contained therein are biased, which may cause mold release failure.

Further, when the fiber-reinforced composite molded article of the present invention is obtained by placing a reinforcing fiber layered material in a cavity of a molding die and injecting the resin into the cavity from a resin injection port provided in the molding die, it is preferred to stir the resin immediately before the start of the injection. This is because in the one- or two-liquid resin composition to which the internal mold release agent is added, the variation in the releasability exhibition effect is reduced by performing the molding in a state where the internal mold release agent is well dispersed in the resin composition.

Further, in the fiber-reinforced composite molded article according to embodiments of the present invention, even in case where it is obtained from a material that is more difficult to control the mold release agent in the resin composition such as one which is molded through an intermediate base material such as a prepreg or a sheet molding compound (SMC), its effect can be exhibited. In case of thus molding based on the intermediate base material, it is preferred that the time until molding is within 3 months after the preparation of the resin composition before curing. This is because in a material such as a prepreg or SMC that is required to be stored for a long period of time at a semi-cured state, the degree of curing varies due to the long-term semi-cured state, so that the flow during molding becomes uneven, and therefore, the bleeding of the mold release agent to the molded article surface is not uniform, and the releasability deteriorates. In order to ensure a better releasability, it is preferably within 2 months after preparation.

[Joined Structure]

The fiber-reinforced composite molded article in the present invention can be used as a joined structure joined to a member made of a metal or another fiber-reinforced composite molded article with an adhesive. Especially in combination with a fiber-reinforced composite molded article, by joining with an adhesive, it is possible to realize a structure that is lighter and more rigid than a metal. Further, when joining by adhesion, a high adhesive strength can be realized without the need for special pretreatment steps other than degreasing, but in order to achieve a higher adhesive quality, energy ray treatments such as atmospheric pressure plasma treatment, corona treatment and ultraviolet ray treatment can be employed. In these energy ray treatments, higher speed processing than pretreatment by polishing such as sanding and process automation can be achieved. In addition, by applying a high energy to the molded article surface, a part of the structure of the mold release agent component on the molded article surface is destroyed to introduce a hydrophilic functional group that has a favorite effect on adhesion, or by roughening the surface with a nano-order, an anchor effect can be exhibited, and by such effects, the reliability of adhesion can be further improved.

EXAMPLES

Hereinafter, the present invention will be explained in more detail by way of examples. The measurement of the contact angle and the calculation of ion intensity ratio due to TOF-SIMS analysis on the molded article surface were determined by using a resin plate not containing reinforcing fibers, for the convenience of analysis. At this time, the following results are considered to become the same as those in fiber-reinforced composite molded articles containing reinforcing fibers. Further, fiber-reinforced composite molded articles were molded using resins having the same compositions as those of the resin molded articles when the contact angle measurement and the TOF-SIMS analysis were performed, and the results of releasability and adhesion evaluated by the following methods are shown together in Table 1 and Table 2. Where, the present invention is not limited thereto.

[Resin Material]

The following resin raw materials were used to obtain the resin compositions of the respective Examples and Comparative Examples. Where, the numerical values of the internal mold release agents in the resin composition columns in Tables 1 and 2 indicate the contents, and the unit thereof is "parts by mass" with respect to other matrix resin raw materials.

Prescription (1)

Bisphenol A type epoxy resin "Epotohto (registered trademark)" YD128 (supplied by Nippon Steel & Sumitomo Metal Corporation): 49 parts by weight, 3 or 4-methylhexahydrophthalic anhydride HN-5500 (supplied by Hitachi Kasei Co., Ltd.): 49 parts by weight, and 1,2-dimethylimidazole "Curezol (registered trademark)" 1,2DMZ (supplied by Shikoku Kasei Kogyo Co., Ltd.): 2 parts by weight

Prescription (2)

Tetraglycidyl methylene aniline "ARALDITE (registered trademark)" MY9655T (supplied by Huntsman Japan Co., Ltd.): 60 parts by mass, 4,4'-methylenebis (2-isopropyl-6-methylaniline) "Lonza Cure (registered trademark)" M-MIPA (Lonza Japan Co., Ltd.): 15 parts by mass, and 2,2',6,6'-tetraethyl-4,4'-methylenedianiline "Lonza Cure (registered trademark)" M-DEA (Lonza Japan Co., Ltd.): 25 parts by mass

Prescription (3)

Trisdiethylphosphinic acid aluminum salt "Exolit (registered trademark)" OP935 (supplied by Clariant Japan Co., Ltd.): 6 parts by weight, bisphenol A type epoxy resin "Epotohto (registered trademark)" YD128 (supplied by Nippon Steel & Sumitomo Metal Corporation): 50 parts by weight, 1,6-hexanediol glycidyl ether YED216M (supplied by Mitsubishi Chemical Corporation): 10 parts by weight, dicyandiamide "jER Cure (registered trademark)" DICY7 (supplied by Mitsubishi Chemical Corporation): 6 parts by weight, 2,4-bis (3,3-dimethylureido) toluene "Omicure (registered trademark)" 24 (supplied by PTI Japan Co., Ltd.): 12 parts by weight, and 3,3-dimethyl-4,4'-diaminodicyclohexylmethane "jER Cure (registered trademark)" 113 (supplied by Mitsubishi Chemical Corporation): 5 parts by weight <Internal Mold Release Agent>

(Reactive Silicone Oil)

both-terminal carboxyl-modified silicone oil "DOWNSIL (registered trademark)" BY 16-750 Fluid (supplied by Dow Toray Co., Ltd.) (indicated as 16-750 in Tables 1 and 2), viscosity: 172 $mm^2/s$, functional group Equivalent: 742 g/mol both-terminal amine-modified silicone oil X-22-161B (supplied by Shin-Etsu Silicone Co., Ltd.), viscosity: 55 $mm^2/s$, functional group equivalent: 1500 g/mol side chain thiol-modified silicone oil KF-2001 (supplied by Shin-Etsu Silicone Co., Ltd.), viscosity: 200 $mm^2/s$, functional group equivalent: 1900 g/mol side chain carboxyl-modified silicone oil "DOWNSIL (registered trademark)" BY 16-880 Fluid (supplied by Dow Toray Co., Ltd.) (indicated as 16-880 in Table 1), viscosity: 2500 $mm^2/s$, functional group equivalent: 3500 g/mol (Non-Reactive Silicone Oil)

side chain ether-modified silicone oil "DOWNSIL (registered trademark)" L-7002 Fluid (supplied by Dow Toray Co., Ltd.) (indicated as L-7002 in Table 2)

(Non-Silicone)

phosphoric acid ester-based derivative composition MOLD WIZ INT-EZ-6 (supplied by Axel Plastic Research Laboratory Corporation) (indicated as EZ-6 in Table 2)

[Reinforcing Fiber Base Material]

<Base Material (1)> bidirectional carbon fiber woven fabric: BT70-30 supplied by Toray Industries, Inc. (thread type: T700S, plain weave)

<Base Material (2)> carbon fiber short fiber mat: supplied by ZOLTEK CORPORATION, (thread type: "Panex35 (registered trademark)" carbon fiber bundle)

<Base material (3)> unidirectional carbon fiber prepreg: P3832-W19 supplied by Toray Industries, Inc. (thread type: T700S)

(1) Preparation of Resin Composition:

The resin raw materials were mixed in a normal temperature environment according to the blending ratios as shown in the above-described resin prescriptions (1), (2) and (3), and after adding the internal mold release agents according to Examples 1 to 12 in Table 1 and Comparative Examples 1 to 8 in Table 2, the resin compositions were prepared by stirring.

(2) Molding of Resin Molded Plate:

Prescriptions (1) and (2): The resin composition prepared by the above-described method was injected into a mold, which was set so that the thickness thereof became 2 mm, in a form sandwiched by release films ("Lumirror (registered trademark)" high smoothness grade supplied by Toray Industries, Inc.), and it was cured under the condition of 140° C. for 2 hours to obtain a resin molded plate.

Prescription (3)

The resin composition prepared by the above-described method was further held under an atmosphere of 40° for 24 hours. After the holding, the thickened composition was charged into a mold, which was set so that the thickness thereof became 2 mm by using a 2 mm thick "Teflon (registered trademark)" spacer, in a form sandwiched by release films ("Lumirror (registered trademark)" high smoothness grade supplied by Toray Industries, Inc.), and a resin molded plate was obtained by compression molding under a condition of 10 MPa and 20 minutes at 140° C.

(3) Measurement of Contact Angle:

With respect to the surface of the resin plate obtained by the above-described method, the measurement was performed under a condition of 23° C. and 50% humidity using a Drop Master DMo-501 contact angle measuring device supplied by Kyowa Interface Science Co., Ltd. 1 μL of pure water was dropped onto the surface of the resin plate, and the contact angle after 1 second was measured.

(4) Surface Analysis of Resin Molded Article by TOF-SIMS:

For test pieces of the resin molded plates shown in Tables 1 and 2, the mass spectra of the outermost surfaces of the molded plates were obtained by using a TOF-SIMS device (TOF. SIMS 5: supplied by ION-TOF Corporation). The measurement was performed on two different regions each having a 300 μm square, and the measurement conditions were for the primary ion species and $2.55e^{+10}$ $ions/cm^2$ for the primary ion irradiation density, and only positive secondary ions were acquired. From the acquired secondary ions, it was determined whether it was derived from silicone oil or epoxy resin, and the ion intensity ratio was calculated based on the maximum intensity of each.

(5) Evaluation of Releasability:

(Preparation of Test Pieces)

The evaluation of releasability was performed using the resin compositions shown in Tables 1 and 2. The measuring jig 1 shown in FIG. 2(*a*) was used for the evaluation of releasability. The measuring jig 1 has a circular shape in a plan view, and is composed of an upper jig 2 and a lower jig 3 having a columnar convex portion 4. A columnar metal piece 6 having a columnar hole 5 that engages with the convex portion 4 and the upper jig 2 were placed on the lower jig 3, and the upper jig 2 and the lower jig 3 were fastened to each other.

Prescription (1): After preheating the jig to 140° C., the resin composition 7 prepared by the aforementioned method was injected onto the metal piece 6 of the measuring jig 1 and heat-cured in an oven at a condition of 140° C. for 2 hours, and an evaluation test piece 9 in which the cured resin product 8 was adhered to the metal piece was prepared.

Prescription (2): After preheating the jig to 100° C., the resin composition 7 prepared by the aforementioned method was injected onto the metal piece 6 of the measuring jig 1 and heat-cured in an oven at a condition of 180° C. for 2 hours, and similarly, an evaluation test piece 9 in which the cured resin product 8 was adhered to the metal piece was prepared.

Prescription (3): The resin composition 7 prepared by the aforementioned method was further kept in an atmosphere of 40° C. for 24 hours. After preheating the measuring jig 1 assembled as described above to about 140° C., the resin composition 7 was placed on the surface of the metal piece 6 and heat-cured at a condition of about 140° C.×20 minutes by a pressure of about 10 MPa with a press machine, and similarly, an evaluation test piece 9 in which the cured resin product 8 was adhered to the metal piece was prepared.

Where, when molding the cured resin product 8, the molding was performed at a state where one 15 mm square base material (1) was placed on the metal piece 6 together with the resin composition 7 to reinforce the cured resin product when measuring the mold release force. Further, when molding the evaluation test piece 9, a silicone rubber string 10 was arranged along the wall surface of the upper jig 2 so that the mold release force was not overestimated by the cured resin product 8 being adhered to the upper jig 2.

(Test for Measuring Mold Release Force)

Figure 2:
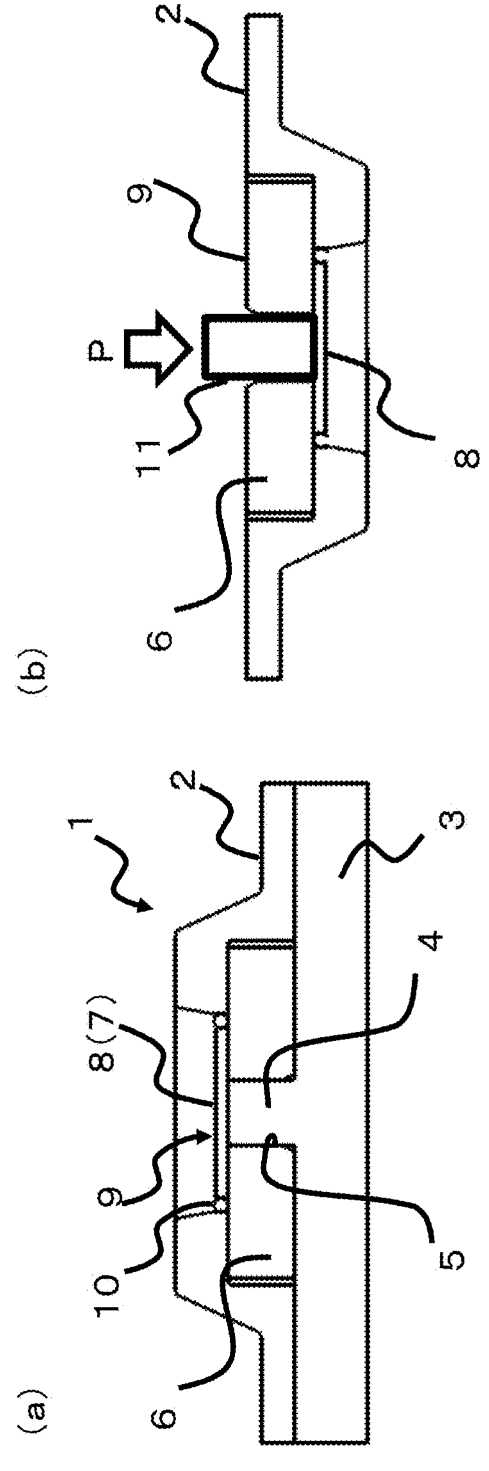
FIG. 2 is a schematic sectional view of a jig for evaluating the releasability when the resin composition according to an embodiment of the present invention is molded.

As shown in FIG. 2(*b*), the evaluation of releasability was performed by molding the cured resin product 8, and then inserting a cylindrical body 11 having the same diameter as that of the hole 5 of the metal piece 6 into the hole 5 at a state where the lower jig 3 and the rubber string 10 were removed, at the same time, applying a load P to the cylindrical body 11 so as to peel off the cured resin product 8 from the metal piece 6, and taking the value obtained by dividing the maximum load at that time by the area of the cured resin product 8 as the mold release force. Further, the fracture surfaces of the metal piece 6 and the cured resin product 8 after the test were visually observed, and the removability of the resin burrs remaining on the surface of the metal piece 6 was also evaluated. Where, the measurement was performed using an electromechanical universal material tester Instron 5565 supplied by Instron Corporation. The evaluation criteria are as follows.

- ⊚ . . . The cured resin product 8 is peeled off from the metal piece 6, and burrs do not remain on the metal piece 6.
- ○ . . . The cured resin product 8 is peeled off from the metal piece 6, but burrs remain on the metal piece 6. The generated burrs can be removed by polishing with sandpaper.
- Δ . . . A The cured resin product 8 is peeled off from the metal piece 6, but burrs remain on the metal piece 6. The generated burrs can be removed only with a scraper.
- × . . . The cured resin product 8 causes fracture of its base material and cannot be peeled off from the metal piece 6.

(6) Evaluation of Adhesion:

(Preparation of Test Pieces)

Prescription (1): Seven base materials (1) were layered on a metal tool plate, and the resin composition 7 prepared by the aforementioned method was impregnated into the base materials by a VaRTM (Vacuum Assisted Resin Transfer Molding) molding method, and after curing it in an oven at 140° C. for 2 hours, a fiber-reinforced resin molded plate (1) having a thickness of 2 mm was obtained.

Prescription (2): Seven base materials (1) were layered on a metal tool plate, and the resin composition 7 prepared by the aforementioned method was impregnated into the base materials by a VaRTM molding method, and after curing it in an oven at 180° C. for 2 hours, a fiber-reinforced resin molded plate (2) having a thickness of 2 mm was obtained.

Prescription (3): The resin composition 7 prepared by the aforementioned method was impregnated into the base material (2) prepared in advance so as to achieve the fiber weight content Wf=50%, and it was kept in an atmosphere of 40° C. for 24 hours. When the resin composition was prepared, the fiber-reinforced resin composition was charged to a press machine heated to 140° C. so that the charge rate became 50%, and it was heat-cured for 20 minutes to obtain a fiber-reinforced resin molded plate (3) having a thickness of 3 mm.

Further, separately from the fiber-reinforced resin molded plate, ten base materials (3) aligned with the fiber directions in the same directions were layered so as to have the same bending rigidity as the fiber-reinforced resin molded plate, and a fiber-reinforced resin molded plate (4) having a thickness of 1.8 mm was obtained by compression molding method.

Figure 3:
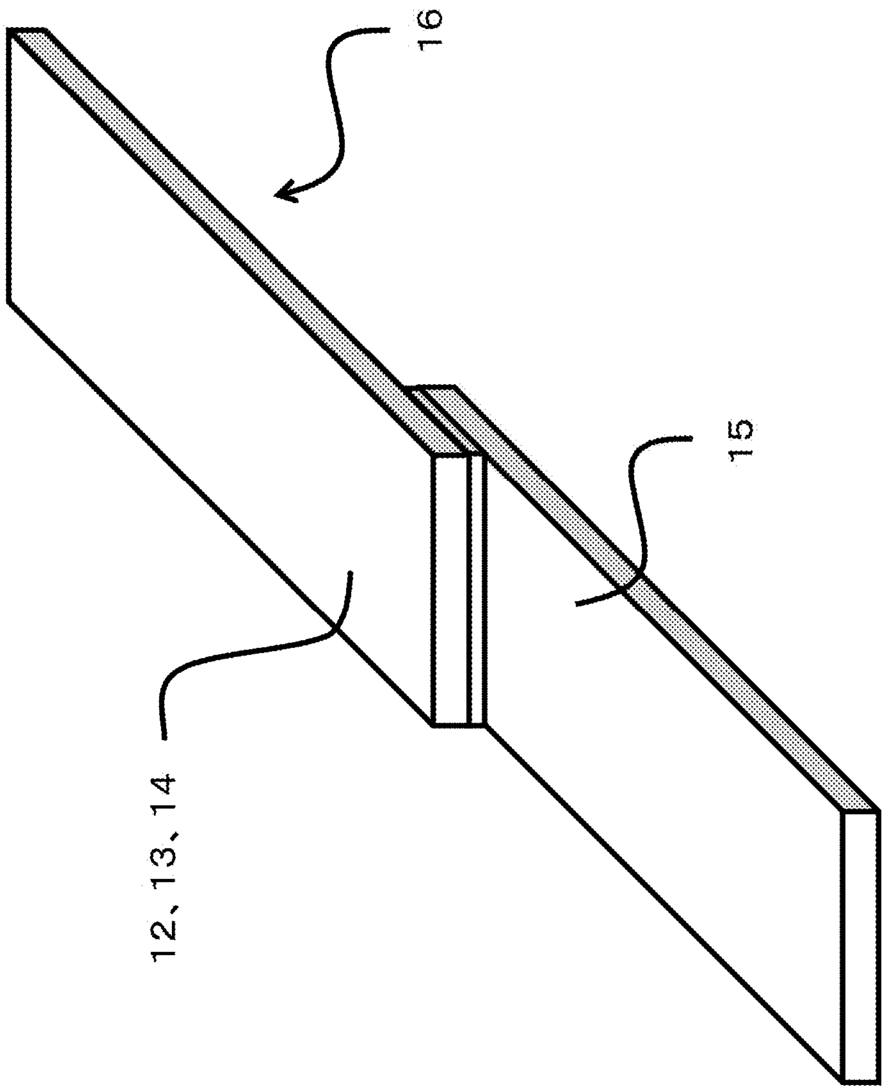
FIG. 3 is a perspective view showing a test piece for evaluating the adhesion of the fiber-reinforced composite molded article according to an embodiment of the present invention.

As shown in FIG. 3, the obtained fiber-reinforced resin molded plates (1) to (4) were cut into strip pieces 12, 13, 14 and 15 each having a width of 25 mm and a length of 100 mm, respectively. After degreasing the strip pieces 12 to 15 with 2-propanol, each of the strip pieces 12, 13 and 14 was bonded to the strip piece 15 with a two-component urethane adhesive (Pliogrip 2400/2808B supplied by Ashland Corporation), and a single-lap shear test piece 16 (adhesive width: 12.5 mm, adhesive length: 25 mm, adhesive thickness: 0.5 mm) described in JIS K6850 (2017) was prepared. Tabs (width: 25 mm, length: 38 mm) were adhered to both ends of the test piece, and a tensile shear test was performed using the electromechanical universal material tester Instron 5589 supplied by Instron Corporation, and the fractured state of the adhesive portion was visually observed. Where, only the strip piece 15 was subjected to a sanding treatment with a #320 sandpaper before degreasing in order to prevent failure at the interface between the strip piece 15 and the adhesive. Further, the evaluation criteria for the adhesive state were as follows.

- ⊚ . . . Cohesive failure progressed over the entire adhesive area.
- ○ . . . Adhesive failure progressed in a part of the adhesive area (adhesive failure rate was less than 50%).
- Δ . . . Adhesive failure proceeded in 50% or more of the adhesive area.
- × . . . Adhesive failure progressed over the entire adhesive area.

Examples 1-12, Comparative Examples 1-8

In Examples 1 to 12, the contact angle of the release surface was 90 degrees or more, and resin burrs were not generated, or even if they were generated, the burrs could be removed by polishing them with a slight force, and a high releasability was exhibited. Further, the ratio of the fragment ion intensity derived from the silicone oil and the fragment ion intensity ratio derived from the epoxy resin became a value from 3 to 20, and in Examples 3 and 7, it was found that both releasability and adhesion showed good results.

In Comparative Examples 1 to 8, the investigations were carried out with respect to cases where non-reactive or non-silicone oil mold release agents were used, and cases where the addition amounts of the silicone oils used in Examples 1 to 12 were extremely reduced and increased. As a result, in Comparative Examples 1 to 3 and 5 to 6, the contact angle became 90 degrees or less, which was a non-water-repellent surface, and the cured resin product 8 did not peel off from the metal piece 6 and caused the base material fracture, in which an adhesion extremely higher than the releasability was exhibited (where, in these Comparative Examples, it was judged that the adhesion was sufficient and the aforementioned adhesion evaluation was omitted). On the other hand, in Comparative Examples 4, 7 and 8, the ion intensity ratio became 20 or more, and there was no problem with respect to the releasability. However, it was confirmed even by visual observation that there were many mold release agents that were excessively bled on the surface of the cured product and on the metal pieces, and even in the evaluation of adhesion, adhesion was not possible by degreasing alone, and the entire adhesive surface was broken by adhesive failure.

TABLE 1

| | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Resin prescription | | (1) | (1) | (1) | (1) | (1) | (2) | (2) | (2) | (2) | (2) | (3) | (3) |
| Internal mold release agent (each numeral: part by mass) | 16-750 | 3 | 1 | — | — | — | 0.5 | 0.3 | — | — | — | 5 | — |
| | X-22-161B | — | — | 0.5 | — | — | — | — | 1 | 0.5 | — | — | 3 |
| | KF-2001 | — | — | — | 1 | — | — | — | — | — | 1 | — | — |
| | 16-880 | — | — | — | — | 3 | — | — | — | — | — | — | — |
| Contact angle (degree) | | 100 | 90 | 95 | 95 | 90 | 95 | 95 | 100 | 95 | 95 | 105 | 100 |
| Ion intensity ratio | | 4 | 3 | 5 | 18 | 15 | 17 | 5 | 18 | 10 | 10 | 5 | 12 |
| Releasability | | ○ | Δ | ◎ | ◎ | Δ | ◎ | ◎ | ◎ | ◎ | ◎ | ◎ | ◎ |
| Adhesion | | ◎ | ◎ | ◎ | ○ | Δ | ○ | ◎ | Δ | ○ | ○ | ◎ | ○ |

TABLE 2

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Resin prescription | | (1) | (1) | (1) | (1) | (2) | (2) | (2) | (3) |
| Internal mold release agent (each numeral: part by mass) | 16-750 | — | — | 0.05 | 5 | — | — | — | — |
| | X-22-161B | — | — | — | — | — | 0.05 | 5 | — |
| | KF-2001 | — | — | — | — | — | — | — | 3 |
| | L-7002 | 3 | — | — | — | 3 | — | — | — |
| | EZ-6 | — | 3 | — | — | — | — | — | — |
| Contact angle (degree) | | 85 | 70 | 80 | 100 | 80 | 80 | 100 | 105 |
| Ion intensity ratio | | 2 | 0 | 1 | 800 | 0.3 | 1 | 200 | 85 |
| Releasability | | X | X | X | ◎ | X | X | ◎ | ◎ |
| Adhesion | | — | — | — | X | — | — | X | X |

The fiber-reinforced composite molded article according to embodiments of the present invention has a good releasability for aircraft applications, automobile applications, sports applications and other general industrial applications, exhibits a releasability from a mold effectively even at a small addition amount of mold release agent, and even without using an external mold release agent to achieve high productivity and quality, and can exhibit a high adhesion with other members even without performing a special surface treatment such as sanding to exhibit excellent mechanical properties.

EXPLANATION OF SYMBOLS

1: measuring jig
2: upper jig
3: lower jig
4: convex portion
5: hole
6: metal piece
7: resin composition
8: cured resin product
9: test piece for releasability evaluation
10: silicone rubber string
11: cylindrical body
12: strip piece
13: strip piece
14: strip piece
15: strip piece
16: single-lap shear test piece

The invention claimed is:

1. A fiber-reinforced composite molded article obtained by molding reinforcing fibers and an epoxy resin, and containing a silicone oil as an internal mold release agent, wherein a fragment ion intensity ratio is detected by a surface of the molded article being analyzed by time-of-flight secondary ion mass spectrometry and is expressed by the following equation (I)

$$3 \leq A/B \leq 5 \quad (I)$$

wherein:

A is an intensity of a fragment ion that has the highest intensity among the fragment ions derived from the silicone oil B is an intensity of a fragment ion that has the highest intensity among the fragment ions derived from the epoxy resin wherein the silicone oil has a functional group equivalent of 300 g/mol or more and 2,000 g/mol or less, and wherein an addition amount of the silicone oil is 0.1 part by mass or more and 1 part by mass or less with respect to 100 parts by mass of the epoxy resin.

2. The fiber-reinforced composite molded article according to claim 1, wherein a contact angle of the surface of the fiber-reinforced composite molded article with respect to water is 90 degrees or more.

3. The fiber-reinforced composite molded article according to claim 1, wherein the silicone oil is an end-modified silicone oil.

4. The fiber-reinforced composite molded article according to claim 1, wherein the silicone oil has a viscosity of 50 $mm^2/s$ or more and 1,000 $mm^2/s$ or less.

5. A joined structure in which the fiber-reinforced composite molded article according to claim 1 is joined to another member with an adhesive.

6. The joined structure according to claim 5, wherein the joining is performed without any pretreatment other than degreasing.

* * * * *